United States Patent [19]

Ferlise et al.

[11] 4,123,189

[45] Oct. 31, 1978

[54] ROTARY-PLUNGE TUBE NOTCHING SYSTEM

[75] Inventors: Louis Ferlise; Sherman E. Mackey, both of Celina, Ohio

[73] Assignee: Huffy Corporation, Miamisburg, Ohio

[21] Appl. No.: 713,908

[22] Filed: Aug. 12, 1976

[51] Int. Cl.² .............................................. B27C 3/00
[52] U.S. Cl. ........................................ 408/21; 83/54; 83/694; 408/44; 408/54
[58] Field of Search .................. 83/7, 9, 54, 694, 519; 408/21, 54, 44, 1; 125/20; 90/14

[56] References Cited

U.S. PATENT DOCUMENTS

| | | | |
|---|---|---|---|
| 2,243,614 | 5/1941 | Vogel | 83/519 |
| 2,879,844 | 3/1959 | Tuttle | 83/519 X |
| 2,923,592 | 2/1960 | Sawdey | 408/44 |
| 3,420,124 | 1/1969 | Trevathan | 408/54 |

*Primary Examiner*—Travis S. McGehee
*Attorney, Agent, or Firm*—Biebel, French & Nauman

[57] ABSTRACT

A system for notching tubes to facilitate their joinder to other tubes or rods, in which a first portion of the notch is formed by a rotary cutting action extending progressively inwardly into the tube side wall and then outwardly in an arcuate path, and the second portion of the notch is formed by a plunging, shearing action which simultaneously punches the entire second portion of the notch out of the wall of the tube. The apparatus for forming each of the notches preferably includes a pair of die halves which together define a tube receiving passage intersected by a tool receiving passage, and a cutting tool positioned in the tool receiving passage. The tool is provided with a substantially axially extending rotary cutting edge for forming the first portion of the notch and a shearing edge for punching out the second portion of the notch when the tool is plunged through the wall of a tube positioned in the intersection of the tube and tool receiving passages. In one form of the invention, two sets of tools and dies may be provided for simultaneously shaping both ends of a tube and a conveyor may be provided for carrying the tubes into and removing them from the tool and die sets.

10 Claims, 34 Drawing Figures

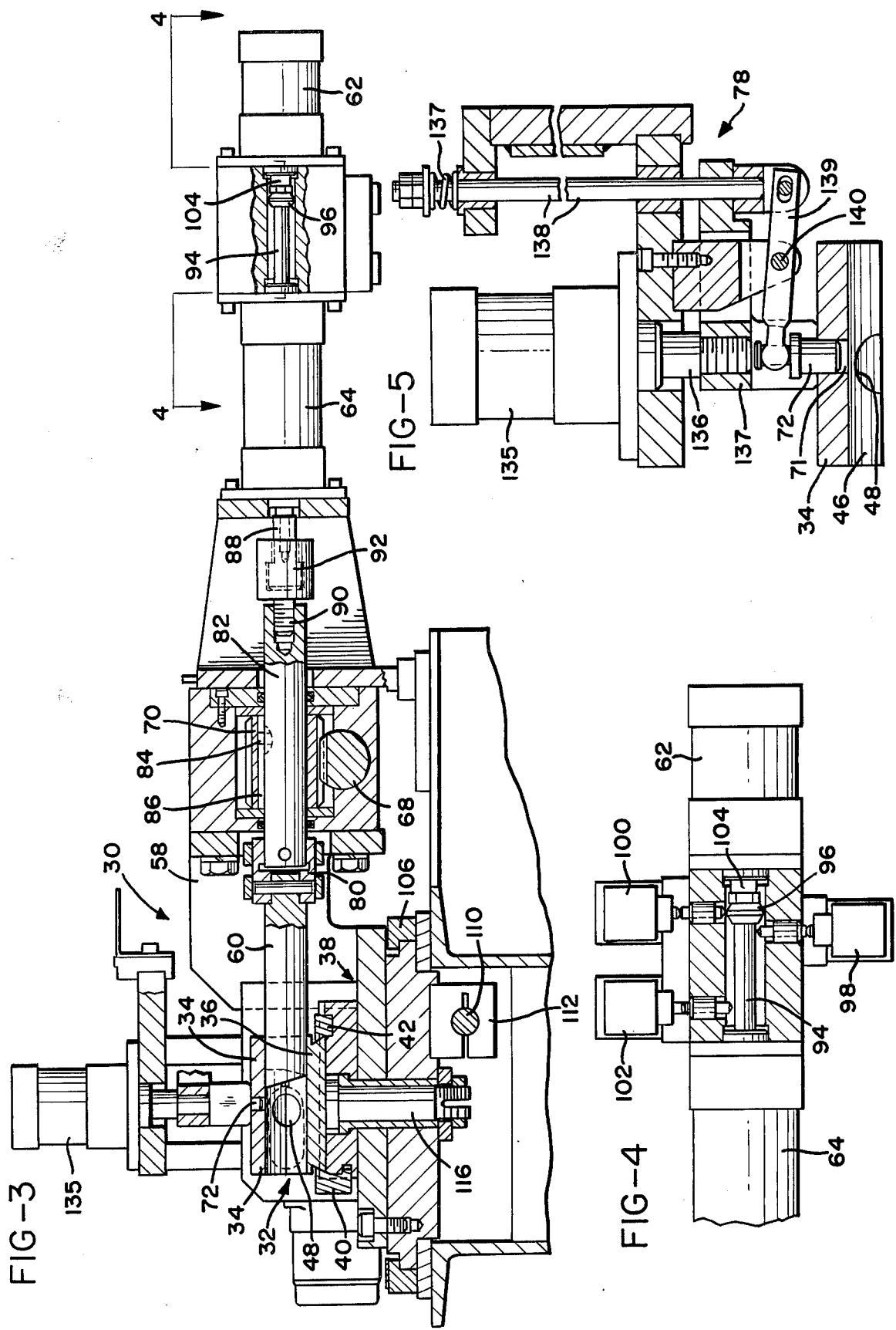

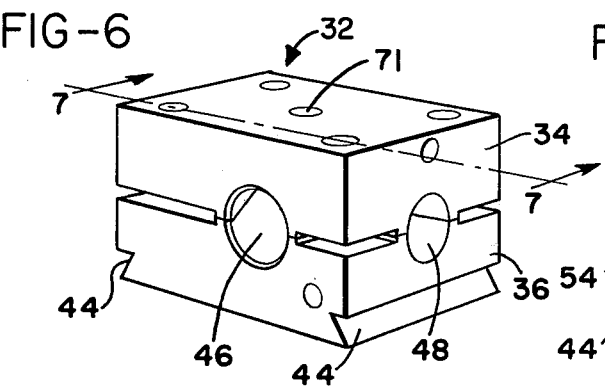
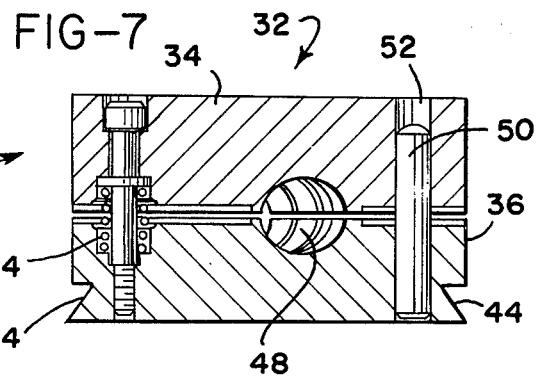
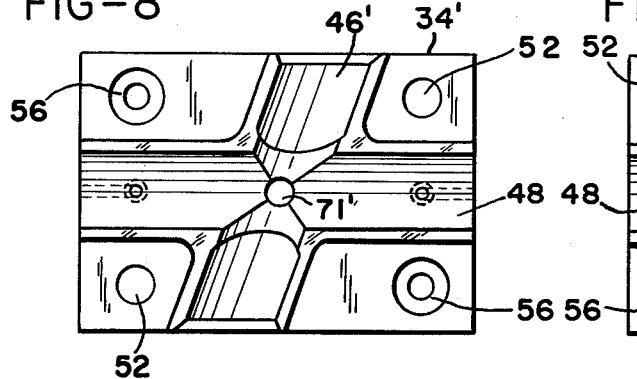
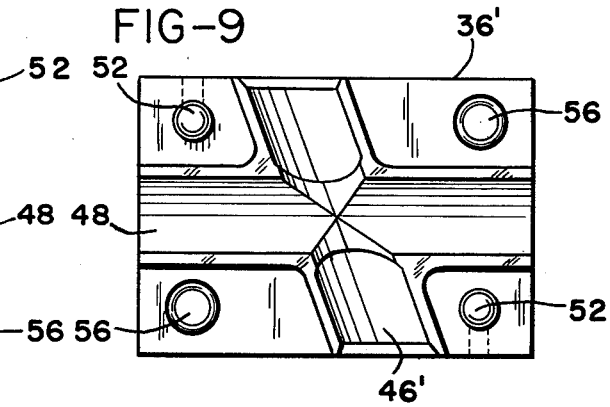
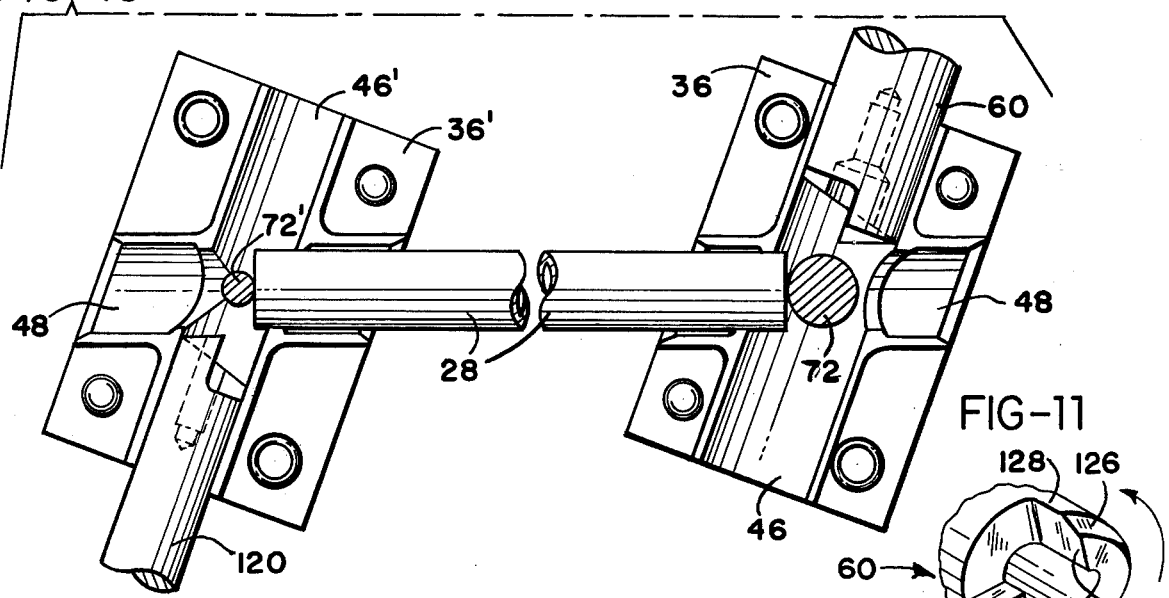
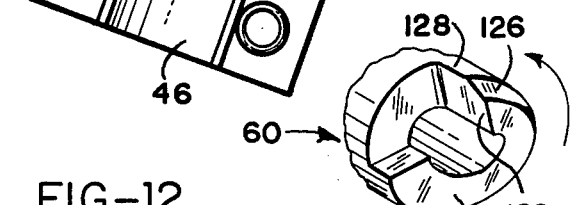
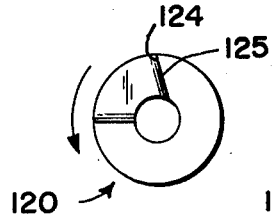
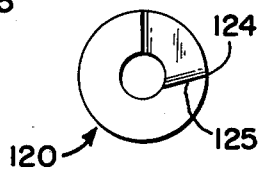
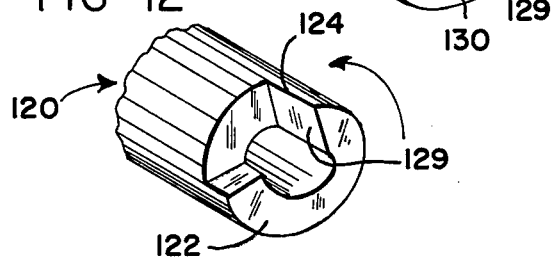

ROTARY-PLUNGE TUBE NOTCHING SYSTEM

BACKGROUND OF THE INVENTION

Fabrication of low cost, high volume, tubular metal consumer products such as bicycle frames, household furniture, automative exhaust systems, lawn and garden equipment and numerous similar structural elements of other such products depends to a significant degree upon the use of low cost methods of joining hollow metal tubing by means of arc welding, electron beam welding, laser welding and brazing or soldering.

The most economic design of these products requires the use of joining methods having a high degree of reliability. The juncture of the tubular elements must be free of sharp notches and corners, voids and foreign inclusions, since operating stresses will often concentrate in such areas of the structure and result in premature fatigue failure. Successful joining of such tubular elements requires that careful consideration be given to the fit of abutting surfaces prior to fusion or welding in order to consistently achieve adequate corner fillets and a smooth transition of the joined surfaces. As an example, laboratory experiments have indicated that consistently satisfactory brazed joints require that all elements of abutting surfaces must be within 0.002 to 0.005 of touching each other, depending, to some degree, upon the filler alloy used.

Historically, numerous methods have been employed to achieve the desired fit of such abutting tubular surfaces. See, for example, U.S. Pat. Nos. 2,746,125; 3,073,195; 3,180,196; and 3,881,385, each of which discloses a system for shaping the end of a tube so that it may be joined to another tubular element.

The most economic of the prior art tube notching methods employs linear shear of the tubing through the use of a suitable punch and die. A common practice in such existing methods is to enclose the tubing about its external peripheral area in a suitable die block having a means for holding and guiding a punch of suitable contour and at a desired angle. The punch is then forced through the hollow tube with sufficient force to shear away the material necessary to produce the desired contour at its intended abutting end. Because the tube wall initially contacted by the punch is not supported internally this method produces substantial deformation at the entry side of the tubing and requires secondary reformation and finishing.

Another popular method involves the similar use of a punch and die wherein the tubing is positioned in the die block so that the punch may enter the open end of the tubing and shear away one half of the desired shape. The tubing is then withdrawn, turned about its axis through 180° and reinserted in another suitable die so that the punch can enter the previously notched end and produce the remaining one half of the desired contour. This method requires careful positioning of the tubing and control of the registry of the previously made one half of the notched contour. It often results in secondary finishing and is relatively time consuming.

Other methods used for contour notching the ends of tubular elements may employ a band saw or a rotatable cutter of the type used for end milling. Such a rotating cutter, having a cutting diameter appropriate to the contour desired, is forced through the tube at a suitable angle, while the tube is held in a suitable vise or holding fixture. While this method generally results in a precision of fit of the contoured end, it is time consuming and requires a substantial capital investment to provide sufficient equipment to support large volume production.

SUMMARY OF THE INVENTION

The rotary-plunge notching system of the present invention includes a method and apparatus for notching a tube without deformation thereof while eliminating the necessity of repositioning the tube for two successive punching operations or the high capital investment necessary to provide sufficient milling equipment for large volume production.

Specifically, in accordance with the present invention a tube may be notched with a single tool which first makes an arcuate cut in a tube by a rotary cutting motion extending progressively from a point of first contact with the outside surface of the tube inwardly in an arcuate path and then back outwardly of the tube. Then the tool is plunged through the tube opposite the first cut with the tool extending through the first cut.

The tool is rotatably and slidably received in a tool receiving passage in a die which also includes a tube receiving passage intersecting the tool receiving passage. A stop is provided at the intersection of the tube and tool receiving passages to position the end of the tube such that it is first engaged by a rotary cutting edge of the tool and, after the first cut of the notch has been formed by rotation of the tool about its longitudinal axis, the second portion of the notch is accomplished by plunging movement of the tool along its longitudinal axis.

The die is preferably formed as a pair of die halves resiliently urged to a slightly spaced apart, open position to receive a tube end, with means provided for closing the die halves about a tube after the tube has been positioned therein.

In a preferred embodiment of the invention a pair of tools and dies are provided for engaging and notching a tube at two points, such as at both ends, and in conjunction with this system conveying means may also be provided for carrying tube sections into position and removing them after they have been notched.

Where the tube to which the notched tube is to be joined is of substantially the same diameter as the notched tube the rotary-plunge notching tool is of substantially the same diameter as the diameter of the tube being notched. However, when the diameter of the tube to which the notched tube is to be joined is of larger diameter than the notched tube the rotary-plunge notching tool must be of similarly larger diameter. In this case, to prevent deformation of the tube being notched by the initial rotary cutting action of the tool the effective length of the cutting edge is decreased by bevelling the forward edge of the notching tool adjacent the rotary cutting edge thereof.

In accordance with a further feature of the invention, the forward edge of the tool may extend spirally rearwardly about the longitudinal axis of the tool to provide a portion of the curved outer surface of the tool in contact with the freshly cut portion of the tube to prevent shifting of the tube prior to the plunging cut.

In some instances it may be desirable to form an opening through a tube intermediate its ends, as, for example, where it is desired to intersect the tube with a tube of smaller diameter. An opening through the tube can also be formed by utilizing the rotary-plunge technique of the present invention.

From the above and the following description, it will be seen that the present invention provides a system for notching tubes on a rapid, high volume basis without deformation of the tube and the necessity of secondary finishing and without resort to a two step operation or the expense of providing a milling operation of sufficient capacity to achieve high volume production.

BRIEF DESCRIPTION OF THE DRAWINGS

FIG. 3 is an elevational view with parts in section illustrating a tool and die assembly in accordance with the present invention;

FIG. 4 is a cross-sectional view taken on lines 4—4 of FIG. 3;

FIG. 5 is an enlarged view with parts in section of a portion of the tube positioning mechanism;

FIG. 6 is a perspective view of a die in accordance with the present invention;

FIG. 7 is a cross-sectional view taken on line 7—7 of FIG. 6;

FIG. 8 is a plan view of a top half of a die;

FIG. 9 is a view similar to FIG. 8, but showing a bottom half of the die;

FIG. 10 is a plan view, partly in section, showing an unnotched tube positioned within a pair of dies prior to the notching process;

FIG. 11 is a perspective view of the forward edge of the tool shown at the right hand side of FIG. 10;

FIG. 12 is a similar perspective view of the forward edge of the tool shown at the left hand side of FIG. 10;

FIGS. 13 and 14 illustrate movement of the tool during the rotary cutting action;

DESCRIPTION OF THE PREFERRED EMBODIMENT

Figure 1:
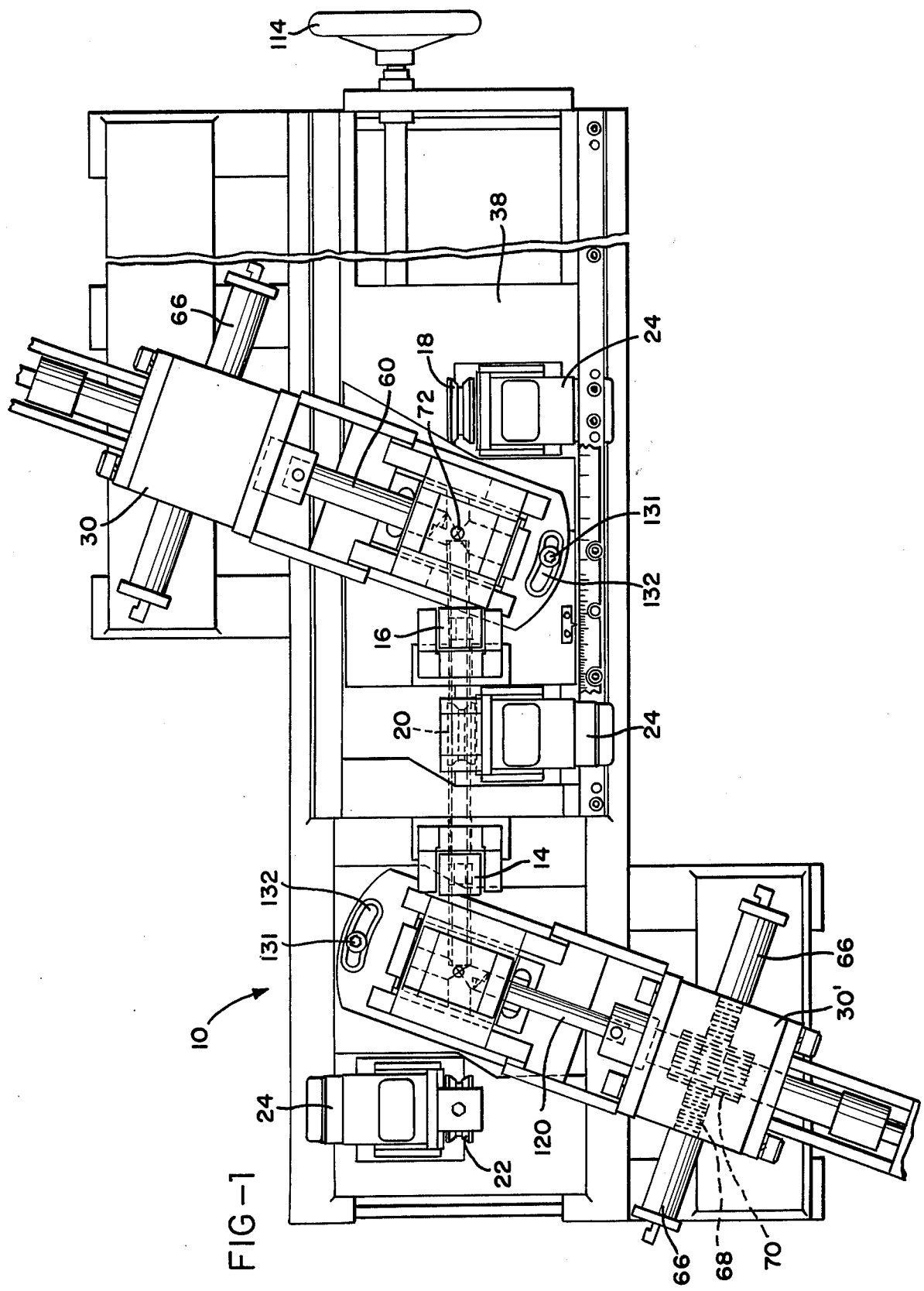
FIG. 1 is a plan view of apparatus in accordance with the present invention with portions of the tool actuating mechanism removed.
Figure 2:
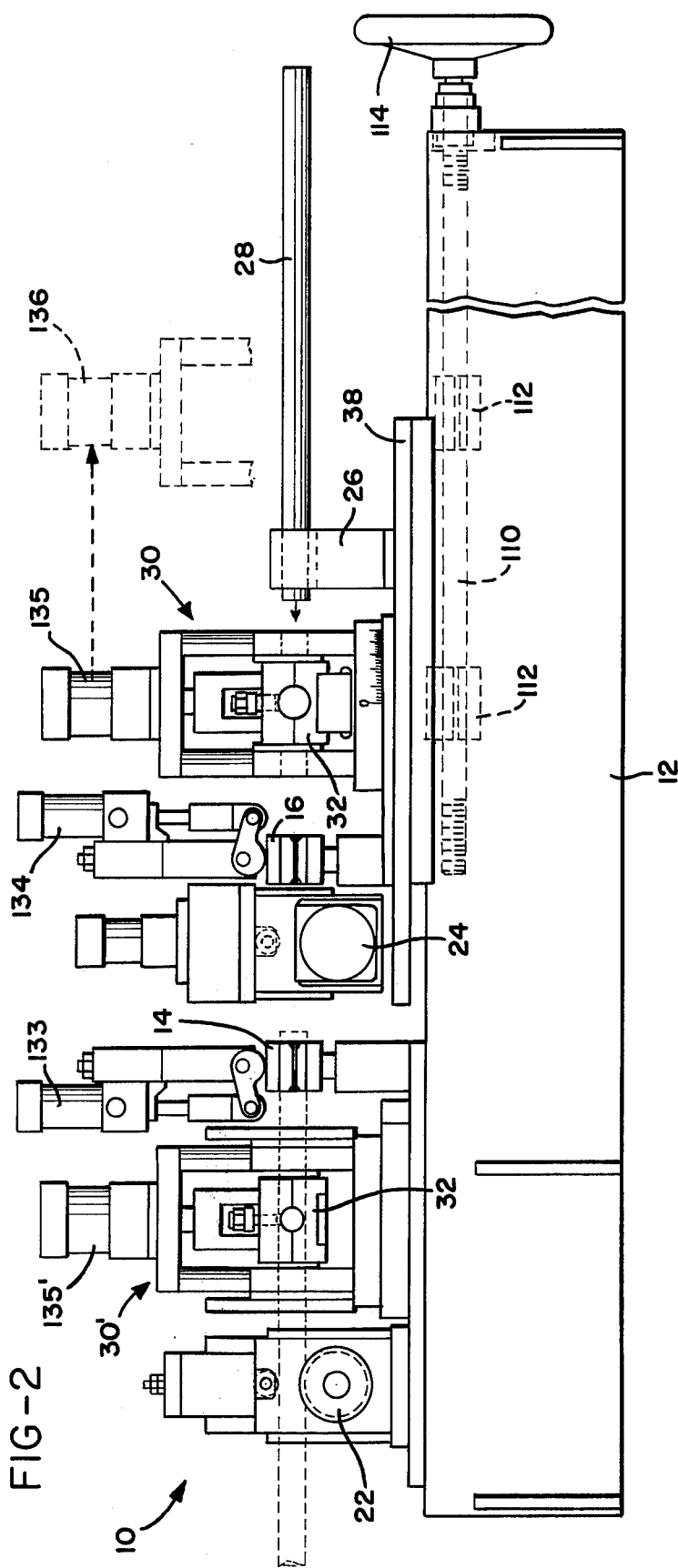
FIG. 2 is an elevational view of the apparatus of FIG. 1, but with the tool and die assemblies rotated from the position shown in FIG. 1 and the tool rotary actuating mechanism eliminated for purposes of clarity.

As seen in FIGS. 1 and 2 of the drawings, rotary-plunge tube notching apparatus 10 in accordance with the present invention includes a supporting framework 12, a pair of tube clamps 14 and 16, and upstream, intermediate and downstream rollers 18, 20 and 22, respectively, each of which is driven by a hydraulic or other motor 24. Alternatively, and as seen in FIG. 2, the upstream roller 18 and associated motor can be replaced with a simple V-block 26 suitable for positioning the end of a tube 28 for manual feeding into the machine.

Regardless of this, it will be noted that the machine includes tube notching die and tool sets, a pair being shown at 30 and 30', although it will be apparent that a single die and tool set can be used if desired. With some exceptions, each die and tool set is substantially identical to the other, and except where otherwise noted the description of one will suffice for both.

Thus, as best seen in FIG. 3, each tool and die set includes a die 32, 32' (see also FIGS. 6 through 9 of the drawings) with each die including upper and lower die halves 34, 34', and 36, 36', respectively. The lower die half is mounted in a base plate 38 and attached thereto by locking members 40 and 42 (FIG. 3) received in the dove tailed grooves 44 formed in the lower die half.

Both die halves have substantially semi-circular impressions in their opposing faces which, when the die halves are brought together, define tool receiving passages 46, 46' and tube receiving passages 48. Guide pins 50 are received in both the upper and lower halves in openings 52 formed in diametrically opposed corners of the die halves, and springs 54 are received in openings 56 in the remaining corners for urging the die halves to an open, slightly spaced apart position.

A mounting bracket 58 carries the tool 60 and associated drive mechanisms. Each drive mechanism includes a pair of hydraulically or pneumatically operated pistons and cylinders 62 and 64 for imparting longitudinal motion to the tool 60 and, as best seen in FIG. 1, opposed pistons and cylinders 66 which, working through a rack 68 and hollow pinion 70, impart a rotary motion to the tool about its longitudinal axis.

Slidably received in openings 71, 71' in the top die halves 34, 34' are locating pins 72, 72' (see also FIG. 5). Through linkage 78, explained in more detail below, the locating pins 72, 72' are actuated and pin 72 can be utilized to initiate further steps in the process.

It will be seen in FIG. 3 that one end of the tool 60 is coupled by means of a collar 80 to a shaft 82 which in turn is keyed by means of a key 84 received in a longitudinally extending keyway 86 in the hollow pinion 70. This permits relative longitudinal movement between the shaft 82 and the pinion 70, although these two members are locked together for simultaneous rotational movement about the axis of shaft 82.

The piston and cylinder 64 has the piston rod 88 thereof joined to an end 90 of the shaft 82 by an adjustable coupling 92 which permits adjustment longitudinally of the position of the tool 60. The piston and cylinder 64 has a second piston rod 94 projecting from its opposite end, also seen in FIG. 4, and provided with a switch engaging head 96 adapted to engage limit switches 98, 100 and 102. The piston and cylinder 62 has its piston rod 104 projecting outwardly to engage the head 96 of piston rod 94, although it is not attached thereto.

It will be particularly noted from FIGS. 1 through 3 of the drawings that to accommodate tubes of different lengths the base 38 of the upstream die and tool set is mounted for sliding movement longitudinally of the machine along trackways 106 and 108. A threaded shaft 110 received in threaded blocks 112 and rotatable by a handle 114 can be used to move the upstream die and tool set along the trackways.

It will also be noted particularly from FIGS. 1 and 3 of the drawings that the die and tool sets and associated operating mechanism are angularly adjustable by means of the swivel mounting 116. Thus the angularity of the tool and die sets with respect to the longitudinal axis of the machine can be adjusted if desired, and in this regard, it will be noted that the tool and die sets are shown acutely angularly disposed with respect to the longitudinal axis of the machine in FIG. 1 and perpendicular thereto in FIG. 2. Of course when the angular disposition of the tool and die sets is varied different dies must be used so that the tube receiving passages 48 thereof are aligned with each other and the longitudinal axis of the machine.

As shown in FIG. 12 of the drawings, a rotary-plunge tool 120 in accordance with the present invention has a forward edge thereof contoured to a particular configuration, including a rearwardly inclined section 122 which spirals about the longitudinal axis of the tool and a cutting edge 124 defined by the outer circumference of the tool and a face 125 thereof which extends in chord-like relationship to the tool outer circumference.

The corresponding portions of the larger diameter tool 60 shown in FIG. 11 are in most respects the same as that shown in FIG. 12. However, tool 60 is provided with a bevelled portion 126, the amount of the bevel decreasing from a maximum at the cutting edge 128 defined by the outer circumference of the tool and the chord-like face 129 thereof. This serves to reduce the effective cutting length of the edge 128 and provides a slightly different shape for the rearwardly inclined section 130.

With the above structure operation of the apparatus is as follows. Assuming that the tube to be notched is to be joined to a tube of the same diameter at its leading end and a tube of larger diameter at its trailing end, the tools 120 and 60 would be selected to be of the same diameter as the part to which the tube is to be joined. Thus, the tool 60 is somewhat larger in diameter than the tool 120 and, therefore, the passage 46 in which it is received is somewhat larger than the corresponding passage 46' of the die and tool set 30'.

The position of the upstream die and tool set 30 is adjusted longitudinally of the machine for the particular length of tubing to be notched and each die and tool set is angularly disposed about its swivel 116 and locked into position by means of the lock bolts 131 (FIG. 1) received in the arcuate slots 132, the appropriate dies having been selected beforehand so that the tube receiving passages thereof are aligned when the die and tool sets have been angularly adjusted as desired.

At the start of the tube notching operation, the lower ends of pistons and cylinders 133 and 134, controlling clamps 14 and 16, respectively, are pressurized and the clamps are open. The pistons and cylinders 135, 135' controlling the dies 32, 32' are depressurized allowing the die halves to be spread apart by the springs 54. Additionally, the locating pins 72, 72' are in their raised positions clear of the intersection of the tube and tool receiving passages of their respective dies as shown in FIG. 5 of the drawings.

The motors 24 may be continuously running and where an in-feed roller 18 is utilized a tube is placed thereon and propelled by the roller 18 through the tube receiving passage of the upstream die, through the clamp 16 and onto the roller 20, which further propels the tube through the clamp 14 and into the downstream die.

By operation of any suitable control mechanism, actuated for example by passage of the tube leading end through the beam of an electric eye or other device, the lower ends of the pistons and cylinders 135, 135' are pressurized causing the pistons therein (not shown) to raise. With reference to FIG. 5, the operation of the upstream unit will be described. Except where noted otherwise the downstream unit operates substantially the same. Pressurization of the lower side of piston and cylinder 135 causes piston rod 136 and yoke 137 attached thereto to move upwardly. Spring 137 urges rod 138 upwardly so that as yoke 137 moves lever 139 pivots about fixed pivot 140 moving pin 72 into the passage 46. The downstream pin 72' drops into place to engage the leading end of the tube. The upstream pin 72 moves into contact with upper surface of the tube and rides along it until the trailing end of the tube is reached, allowing the pin 72 to drop into place in the passage 46.

Assuming that the die and tool sets have been adjusted properly for the length of the tube desired and the tube is of the proper length, as the tube leading end engages pin 72' the upstream locating pin 72 can then drop into place and through the associated control circuitry which per se does not form part of the present invention, the upper ends of the cylinders 133 and 134 are pressurized, closing the clamps 14 and 16 about the tube. Until the clamps close the roller 20 holds the tube leading end against the downstream pin 72', thereby assuring that the tube is in proper position before the subsequent cutting and shearing actions take place.

A pressure switch associated with the cylinders 133, 134 for the clamps 14 and 16 is actuated by the closing of the clamps, causing the cylinders 135, 135' to pressurize and close the dies 32, 32' about the opposite ends of the tube.

Again with reference to FIG. 5, it will be seen that pressurizing the upper ends of the pistons and cylinders 135 causes their respective piston rods, as at 136 in FIG. 5, to move downwardly together with the attached yoke 137. The yoke 137, though not attached to the upper die half 34, presses downwardly on it, overcoming the spring pressure tending to hold the die halves spaced apart. Movement of the yoke 137 downwardly also causes the rod 138 to move downwardly overcoming the pressure of spring 137. This in turn pivots lever 139 about fixed pivot point 140 and causes the pin 72 to move upwardly out of the passage 46.

At this time, the tools 60 and 120 are in the positions shown in FIG. 10 of the drawings with respect to a tube 28 and the pins 72, 72', shown in section in FIG. 10, are clear of the tube and tool receiving passages.

Figure 15:
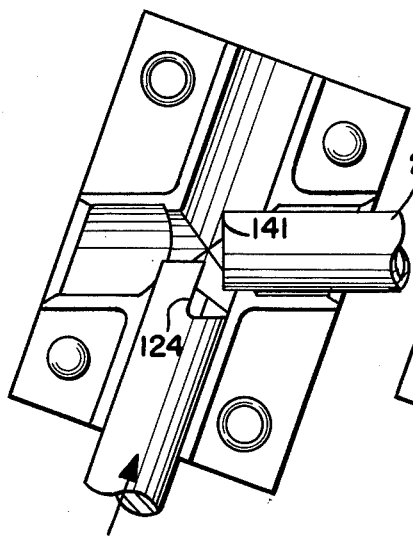
FIGS. 15 through 17 illustrate the notching process.

The cutting edges of each of the tools 60 and 120 are in approximately the 12 o'clock position as viewed from the forward end of the tool and as seen for example in FIG. 13. Thereafter, the piston and cylinder 62 is actuated, causing the head 96 to be pushed forward until the piston of piston and cylinder 62 has reched its maximum point of travel. Simultaneously switch 98 is closed. At this time the tool is positioned with its cutting edge positioned opposite the edge of the end of the tube 28, as seen in FIG. 15 of the drawings.

Figure 16:
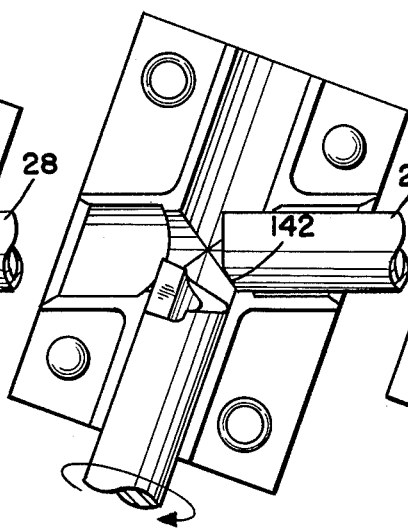

Next one of the opposed pistons and cylinders 66 is actuated, causing the tool to be rotated about its longitudinal axis as shown in FIG. 16 and causing the cutting edge of the tool to form an arcuate cut extending inwardly of the tube edge 141 and then back outwardly to the edge at a point spaced circumferentially from the point of first contact to form a first arcuate cut 142. A rotational movement of approximately 180° will accomplish this, but in actual practice a rotation of 270° is utilized, as indicated in FIGS. 13 and 14 of the drawings.

Figure 17:
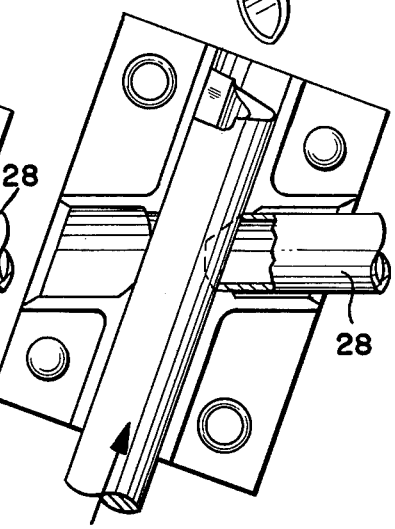

Completion of the rotary cutting movement of the tools positions a portion of the forward end of each of the punching tools opposite an inner wall of the tube. With the tools in this position the pistons and cylinders 64 are actuated, causing the tool to plunge forward from the position shown in FIG. 16 to that shown in FIG. 17.

This forms a second arcuate cut 140 opposite that formed by the rotary motion of the tool and at the same time ejects a slug 146 of severed material to complete the notching of the ends of the tube. During forward movement of the tools during the plunging cut, it will be seen that piston rod 104 does not follow piston rod 94 since it is not attached thereto, the piston rod 104 serving only to provide the short stroke necessary to move the tool into its initial cutting position.

The above described operation applies generally to the notching at both ends of the tube. It will be noted, however, that for purposes of illustration a system was described wherein the upstream end of the tube was to be noched to mate with a larger diameter tube while the downstream end of the tube was notched to mate with a tube of the same diameter. For this reason the tool 60 is of larger diameter than the tool 120 and there is some variation in the specifics of the notching process, although the same rotary-plunge movements are utilized.

Figure 18A:
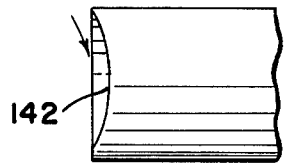
FIGS. 18A and B illustrate the end of a tube after the rotary cut.
Figure 19A:
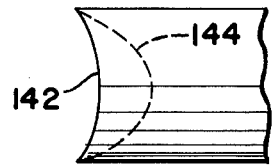
FIGS. 19A and B illustrate the end of the tube after both the rotary and plunge cuts have been made.
Figure 20:
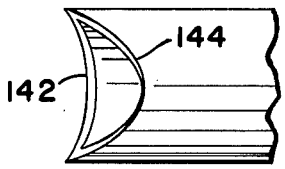
FIG. 20 is a view similar to FIG. 19A but taken from the opposite side of the tube.
Figure 18B:
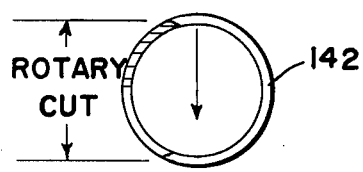
Figure 19:
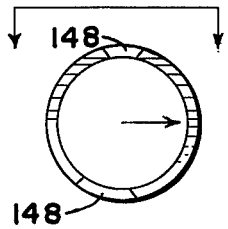
Figure 21:
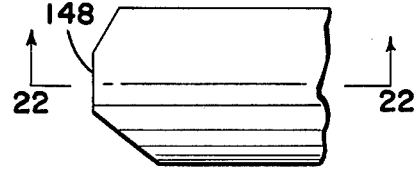
FIG. 21 is a view taken along line 21—21 of FIG. 19B.
Figure 22:
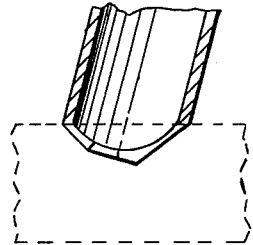
FIG. 22 is a view along line 22—22 of FIG. 21 and showing in dotted lines a second tube of the same diameter as the notched tube to which the notched tube is to be joined.
Figure 23:
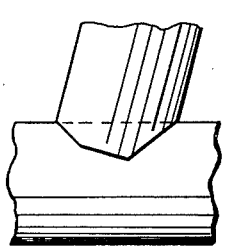
FIG. 23 illustrates the tube of FIG. 21 joined to a second tube of the same diameter.
Figure 24:
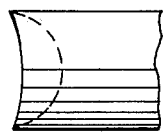
FIG. 24 is a view similar to FIG. 19A, but showing a tube notched to be joined to a tube of larger diameter.

Thus, with reference to the tool 120 and FIGS. 10 and 15 of the drawings, it will be seen that the pin 72' spaces the edge of the leading end of the tube somewhat upstream from the exact center of the intersection of the tube and tool receiving passages. As a result, when the rotary cut is made it does not extend to the center of the tube. This is best seen in FIGS. 18A and B wherein the tube end is shown after the initial rotary cut 142.

After the tool is plunged forward the end of the tube appears as shown in FIGS. 19 through 23 and in this regard, it will be seen that the punch cut 144 does not quite extend to the center of the tube, resulting in opposed flatted portions 148. These flatted portions do not prevent a close fit being made with the tube to which it is joined and they provide an advantage as described below.

Thus, it would be possible to locate the tube end closer to the center of the intersection of the tube and tool receiving passages and position the tool prior to the rotary cut such that the flatted portions 148 were avoided and very fine feathered edges produced at the areas of the tube where the rotary and plunge cuts meet. Delicate feathered edges, however, could easily be damaged during subsequent handling, thereby necessitating secondary refinishing. The flatted portion, on the other hand, is much less susceptible to damage.

Figure 25:
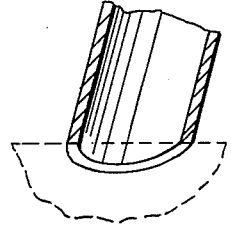
FIG. 25 is a cross-sectional view of the tube of FIG. 24 showing a larger diameter tube in dotted lines.
Figure 26:
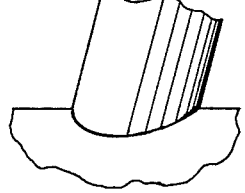
FIG. 26 is a view showing the tube of FIG. 24 joined to a second tube of larger diameter.

While the end of the tube cut by the larger tool 60 does not have a flatted portion, as can be seen in FIGS. 25 and 26 of the drawings, because the tool 60 is larger in diameter than the tube 28 the formation of a delicate, feathered cut edge is avoided.

It will also be noted that because of the larger diameter of the tool 60 the effective cutting length of the rotary cutting edge 128 must be reduced. Thus, if the cutting edge 128 were formed similarly to the cutting edge 124, the initial rotary motion of the tool would bring a portion of the cutting edge down on top of the outside wall of the tube, causing deformation thereof. However, by providing a bevel 126, FIG. 11 of the drawings, the effective cutting length 128 is decreased to the extent necessary to restrict rotary cutting action to engagement of the edge of the tube end by the cutting edge 128.

Regardless of the relative sizes of the tools and tubes being notched, it will be seen that during the first portion of the cut there are no forces applied against unsupported areas of the tube, the rotary cutting action being directed more or less in the plane of that portion of the tube being acted upon during the cut.

In the subsequent plunge cut the wall of the tube engaged by the forward edge of the tool is supported by the downstream sides of the upper and lower die halves, so that distortion is avoided during this portion of the cut as well. It will also be noted from FIGS. 11 through 14 that each tool has a section 122, 130, respectively which allows a portion of the curved outer surface of the tool to engage the rotary cut portion of the tube as the cut is formed to prevent movement or shifting of the tube prior to the plunge cut.

Following completion of the plunge cut, the tools 60 and 120 are retracted by their respective pistons and cylinders 64, while at the same time they are rotated back to their starting positions by actuation of one of the pistons and cylinder 66 of the rack and pinion actuating mechanism. Thereafter the dies and clamps open and the notched tube is propelled from the apparatus by the power driven rollers 20 and 22.

Figure 27:
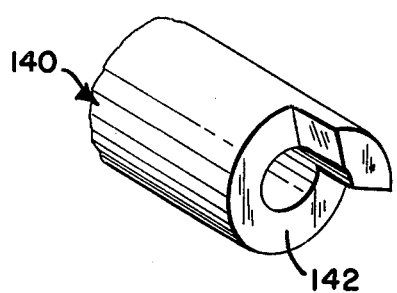
FIGS. 27 and 28 are perspective views of modified forms of cutting tools.

The tools shown in FIGS. 11 and 12 of the drawings are provided with spirally extending forward edges 130 and 122 for the purpose described above. However, in some instances the use of a spiral forward edge may be unnecessary and as shown in FIG. 27 of the drawings a tool 140 can be provided with a blunt forward face 142, which has been found to serve effectively in the plunge portion of the cutting operation.

Figure 28:
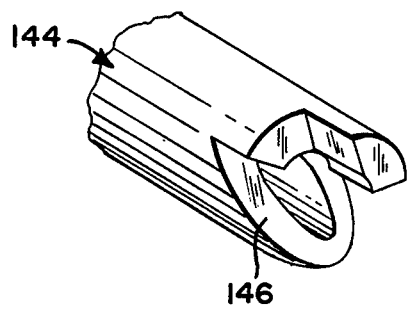

FIG. 28 shows still a further embodiment of a cutting tool 144 wherein the forward edge 146 is cut back rearwardly into the tool to give an overall V-shaped configuration as viewed from the side of the tool. In some operations the forwardly sloping face 146 will facilitate severing the tube during the plunge portion of the cutting operation.

In the description of the tube cutting operation thus far it will be noted that the rotary cutting edge of the tool engages in the first instance an edge of an end of the tube being notched, and as best seen in FIG. 10, the tools approach the ends of the tube in opposing directions. In some instances it will be desirable for both tools to move in the same direction, where, for example, the tubes are fed into the tube notching machine from the side, top or bottom of the machine rather than in a direction coincident with the axis of the tube.

While the embodiment shown in FIG. 10 of the drawings could be modified by simply positioning the tool 60 so that it approached the tube 28 in the same direction as the tool 120 and merely took a larger bite during the rotary cutting action than in the plunge portion of the cut, this would appreciably shorten the life of the cutting edge of the tool. In other words, it is desirable that the smaller portion of the notch be made by the rotary action of the tool and the major portion of the notching operation be accomplished by the plunge cut.

Figure 29:
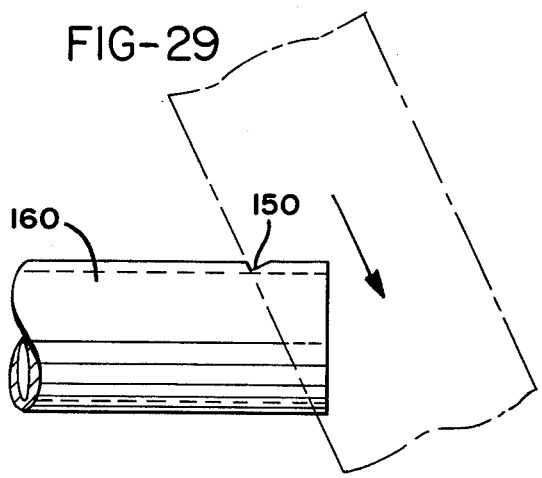
FIG. 29 is a plan view, partly in section, showing an end of a tube prior to the rotary portion of the cut in accordance with a second form of the invention.

To achieve this and at the same time allow both ends of the tube to be notched by tools moving in the same direction, the invention as described above may be modified in accordance with the construction shown in FIG. 29 of the drawings.

Figure 30:
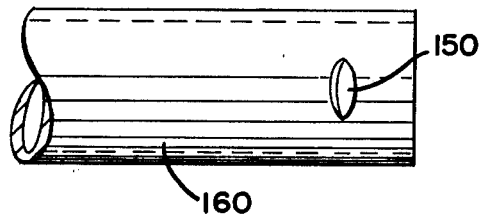
FIG. 30 shows a portion of a tube after a rotary cut in accordance with the embodiment of FIG. 29.

FIG. 29 corresponds generally to the right hand side of FIG. 10 of the drawings with the exception that the tool approaches the tube from a direction opposite to that shown in FIG. 10. However, rather than the major portion of the notch being accomplished by the rotary cut, it has been found that if a relatively small notch, as shown at 150, is first formed in the tube by a rotary cut, the following plunge cut can be made without deformation of the tube wall, although there will be deformation of the slug of scrap, which however is immaterial. The cut 150 as also seen in FIG. 30 of the drawings may be no deeper than approximately 60% of the thickness of the tube wall and certainly need not be any greater than a depth just sufficient to break through the inner surface of the tube.

Figure 31:
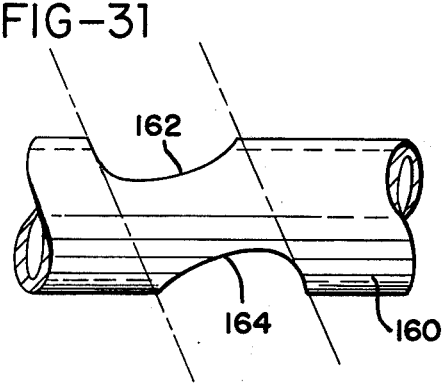
FIG. 31 is a side view of a tube cut intermediate its ends in accordance with the present invention.
Figure 32:
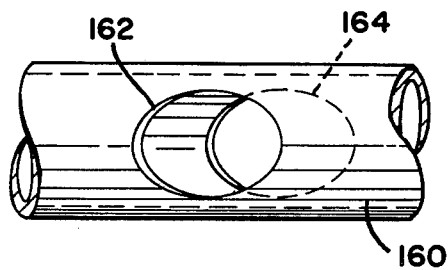
FIG. 32 is a view taken along line 32—32 of FIG. 31.

While for the most part the present invention is concerned with the notching of the tube ends to facilitate their joinder to the outside surfaces of other tubes or rods, the present invention may also be utilized to form a through hole through a tube as seen in FIGS. 31 and 32 of the drawings. Thus a tube 160 shown in FIG. 31 has first formed therein by the rotary action of the tool an arcuate cut 162 which appears elliptical in plan view because it is made along an axis inclined with respect to the axis of the tube. Thereafter, the opposite portion 164 of the cut is made through a plunging action of the tool. In this way an opening sufficient to accommodate a tube or rod of smaller diameter than the tube 160 can be formed.

From the above it will be apparent that the present invention provides a system of notching the ends of a tube or forming an opening through a tube without risk of deformation of the tube wall, but yet in a single, relatively inexpensive operation.

While the methods and forms of apparatus herein described constitute preferred embodiments of the invention, it is to be understood that the invention is not limited to these precise methods and forms of apparatus, and that changes may be made therein without departing from the scope of the invention.

What is claimed is:

1. Tube notching apparatus comprising:
  a die including a tube receiving passage and a tool receiving passage,
  said passages intersecting and crossing each other at an intersection thereof with portions of each of said passages extending in opposite directions from said intersection,
  stop means projectable into said intersection of said tube and tool receiving passages for engaging an edge of an end of a tube as a tube moves through said tube receiving passage into said intersection to position an end of a tube at said intersection,
  a tool rotatably and slidably received in said tool receiving passage,
  said tool including a rotary cutting edge extending substantially axially of said tool and engageable with an edge of an end of a tube positioned at said intersection,
  means for rotating said tool about a longitudinal axis thereof to bring said substantially axially extending rotary cutting edge thereof into engagement with a first portion of an edge of an end of a tube positioned at said intersection by said stop means and remove of a first segment of said tube,
  a plunge shearing surface,
  means for moving said tool axially thereof through said intersection and past said tube receiving passage to bring said plunge shearing surface into engagement with an inner surface of a second portion of an end of a tube positioned at said intersection and remove a second segment thereof opposite said first segment, and
  means for moving said stop means into said intersection to position a tube thereat and out of said intersection prior to said axial movement of said tool through said intersection.

2. The apparatus of claim 1 wherein:
  said plunge shearing surface extends spirally rearwardly from an outer end of said substantially axially extending rotary cutting edge.

3. The apparatus of claim 1 further comprising:
  a supporting base, and
  means mounting said tool and die as a unit on said supporting base for angular adjustment of said unit with respect to said base.

4. The apparatus of claim 1 further comprising:
  a supporting base, and
  means mounting said tool and die as a unit on said base for movement of said unit longitudinally of said base.

5. The apparatus of claim 1 wherein:
  (a) the diameters of said tube receiving passage and said tool are substantially equal.

6. The apparatus of claim 1 wherein:
  (a) the diameter of said tool is substantially larger than the diameter of said tube receiving passage.

7. The apparatus of claim 1 wherein:
  (a) a face of said tool extending inwardly thereof from said cutting edge is chordally disposed with respect to the circumference of said tool.

8. The apparatus of claim 1 further comprising:
  (a) a clamp for holding a tube which is received in said tube receiving passage of said die.

9. The apparatus of claim 1 further comprising:
  (a) means for conveying tubes into and out of said die.

10. The apparatus of claim 1 further comprising:
  (a) a second die and tool for notching a second portion of a tube substantially simultaneously while a first portion thereof is notched by said first named die and tool,
  (b) said second die and tool being of substantially the same configuration as said first named die and tool.

* * * * *